(12) United States Patent
Brogioli et al.

(10) Patent No.: US 8,945,738 B2
(45) Date of Patent: Feb. 3, 2015

(54) DEVICE AND METHOD FOR PRODUCING ELECTRICAL ENERGY THAT USES SOLUTIONS WITH DIFFERENT IONIC CONCENTRATION

(75) Inventors: Doriano Costantino Brogioli, Busto Arsizio (IT); Maria Chiara Nicolo, Quartucciu (IT)

(73) Assignee: Redstack B.V., Sneek (NL)

( * ) Notice: Subject to any disclaimer, the term of this patent is extended or adjusted under 35 U.S.C. 154(b) by 591 days.

(21) Appl. No.: 13/203,824

(22) PCT Filed: Mar. 11, 2010

(86) PCT No.: PCT/NL2010/050123
§ 371 (c)(1),
(2), (4) Date: Nov. 8, 2011

(87) PCT Pub. No.: WO2010/104387
PCT Pub. Date: Sep. 16, 2010

(65) Prior Publication Data
US 2012/0052338 A1    Mar. 1, 2012

(30) Foreign Application Priority Data
Mar. 12, 2009    (IT) .................. MI09A0373

(51) Int. Cl.
*H01M 10/44* (2006.01)
*H02J 7/00* (2006.01)
*H01G 9/00* (2006.01)
*H01G 11/00* (2013.01)
*C02F 1/46* (2006.01)
(Continued)

(52) U.S. Cl.
CPC ............ *H01G 9/155* (2013.01); *C02F 1/46109* (2013.01); *H01G 9/022* (2013.01); *H01G 9/22* (2013.01); *H01G 11/02* (2013.01); *H01G 11/62* (2013.01); *C02F 2001/46123* (2013.01); *C02F 2001/46138* (2013.01); *C02F 2001/46161* (2013.01); *C02F 2103/001* (2013.01); *C02F 2103/007* (2013.01); *C02F 2103/08* (2013.01); *C02F 2201/4612* (2013.01); *C02F 2303/10* (2013.01); *Y02E 60/13* (2013.01)
USPC ............. 429/50; 320/166; 320/167; 361/500; 205/742; 210/748.01

(58) Field of Classification Search
None
See application file for complete search history.

(56) References Cited

U.S. PATENT DOCUMENTS 5,162,972 A    11/1992  Gripshover et al.
5,783,928 A *   7/1998  Okamura ...................... 320/122
(Continued)

FOREIGN PATENT DOCUMENTS

JP    8126294    5/1996

*Primary Examiner* — Jonathan Crepeau
(74) *Attorney, Agent, or Firm* — Rudy J. Ng; Bret E. Field; Boziecevic, Field & Francis LLP

(57) ABSTRACT

A device and related method for producing electrical energy, in the form of current flowing in a load. The said method uses two solutions with different ionic concentration as energy source. The said device includes at least two electrodes immersed at least partially in a liquid contained in a cell. The method includes a plurality of phases. Among them, a phase in which the electrodes and are brought into contact with a first solution; a phase in which they are electrically charged; a phase in which they are brought into contact with a second solution; a phase in which at least a part of the accumulated charge is let flow through the load. The energy provided to the load is more than the energy used to charge the electrodes.

13 Claims, 4 Drawing Sheets

(51) Int. Cl.
*C02F 1/461* (2006.01)
*H01G 9/022* (2006.01)
*H01G 9/22* (2013.01)
*H01G 11/02* (2013.01)
*H01G 11/62* (2013.01)
*C02F 103/00* (2006.01)
*C02F 103/08* (2006.01)

(56) References Cited

U.S. PATENT DOCUMENTS

| | | |
|---|---|---|
| 6,309,532 B1 | 10/2001 | Tran et al. |
| 6,661,643 B2 | 12/2003 | Shiue et al. |
| 6,936,994 B1 | 8/2005 | Gimlan |
| 2008/0185294 A1* | 8/2008 | Cai et al. ............... 205/747 |

* cited by examiner

High concentration phase

Low concentration phase

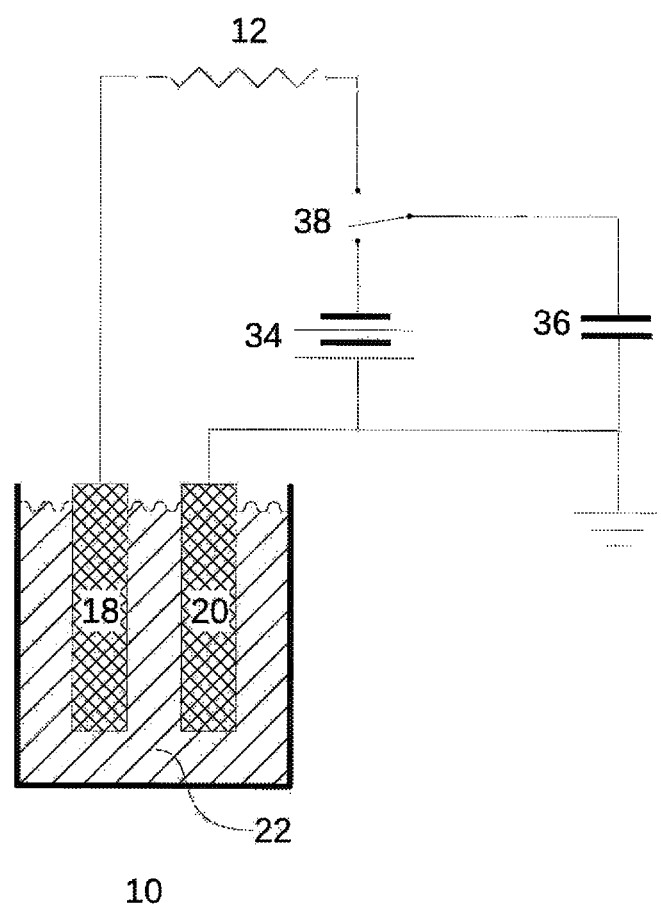

DEVICE AND METHOD FOR PRODUCING ELECTRICAL ENERGY THAT USES SOLUTIONS WITH DIFFERENT IONIC CONCENTRATION

The present invention relates to a device and method for generating electrical energy that uses solutions with different ionic concentration. Such a device can be used, for example, for producing electrical current by exploiting the salinity difference between fresh water, coming from rivers or lakes, and salt water from the sea, or between salt water from the sea and high-salt-concentration water obtained by evaporation ponds.

The interest in exploiting the salinity difference, or salinity gradient, dates back to the 1970s, and resides in the fact that this energy resource is largely available, cheap, non-polluting and renewable.

The main solutions that have been developed are called "Pressure Retarded Osmosis" (PRO), "Reverse Electro-Dialysis" (RED) and "Vapor Pressure" (VP).

The three methods can reach power production of the order of MW with a flow of 1 $m^3$/s of fresh water.

The PRO devices are based on a semipermeable membrane, that separates fresh water from salt water. The osmotic pressure is about 24 atm, corresponding to about 250 m of hydraulic head. The resulting osmotic flow is used to drive and engine, possibly a turbine, which, in turn, drives an alternator or a dynamo. The problem of this kind of devices is the necessity for great quantity of semipermeable membranes, with high permeability, resistant to high pressures. Such membranes are relatively expensive, and their performances rapidly reduce, due to fouling.

Also RED devices are based on membranes. In this case, they are selective membranes, that are permeable to positive or negative ions; alternated membranes are stacked, and water with different salinity is made flow through them.

The selective passing of ions generates potential differences, that are translated into electrical currents through electrodes. Membranes for RED devices are even more expensive than those for PRO, and equally sensitive to materials in suspension.

To avoid the use of membranes, VP devices were finally developed, based on the vapor pressure difference of salt water and fresh water. The pressure difference is used to drive a turbine, which in turn drives an alternator or a dynamo. The small difference in pressure is the major obstacle in developing such systems.

PRO and VP systems, which require moving parts, are more suitable for large plants, while for small or household installations the RED are most promising. Despite the great interest, the cost of these technologies is still high, and they are still not widespread.

The purpose of the present invention is therefore to realize a device for generating electricity, using solutions with different ionic concentrations, that overcomes the drawbacks of known technique, i.e. without necessity of membranes, nor of mechanisms that convert mechanical motion into electricity, such as alternators or dynamos. Moreover, another target of the invention is to realize a device capable of achieving high values of power, for a given amount of used ionic solution.

These targets, according to the present invention, are achieved by realizing an electrical energy generator that uses solutions with different ionic concentrations, as stated in claim 1. Additional features of the invention are stated in the following claims.

The invention further also relates to a method for generating electrical energy using a device as described above. Such method provides the same effects and advantages as described for the device.

The features and the advantages of the device and concerning method for generating electricity by using solutions with different concentrations, according to the present invention, will be more apparent from the description below, illustrative but not restraining, referring to the attached schematic drawings, where:

Figure 5:
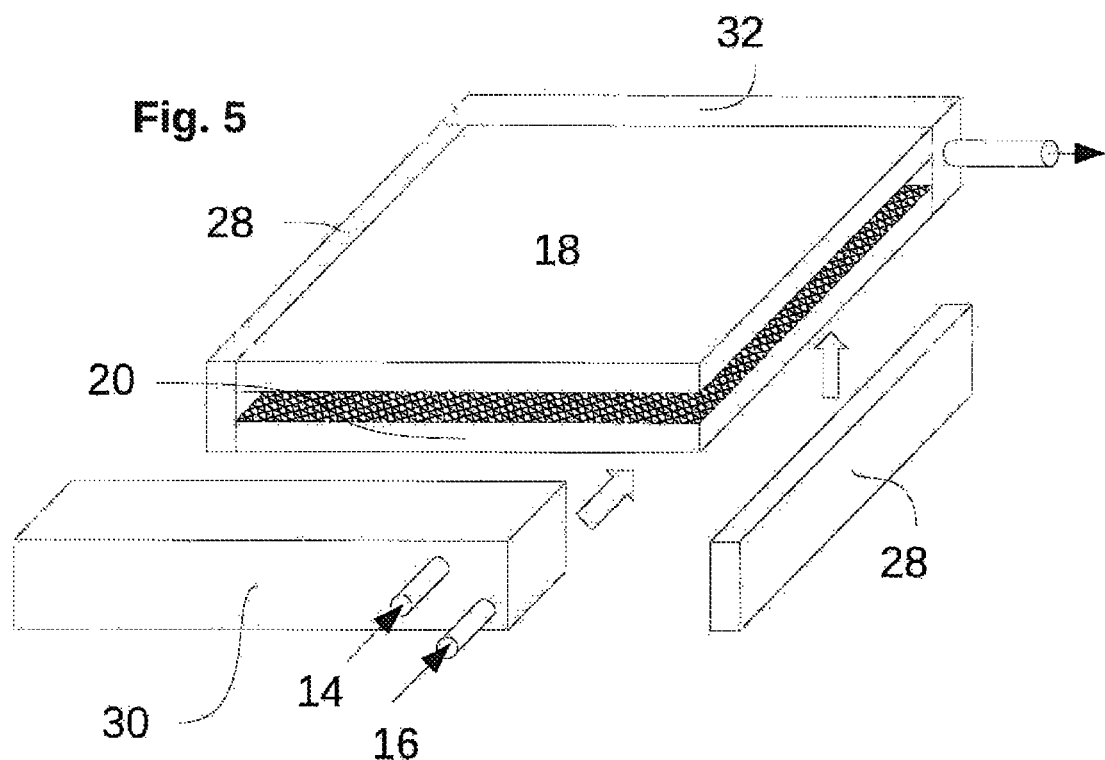
Figure 6:
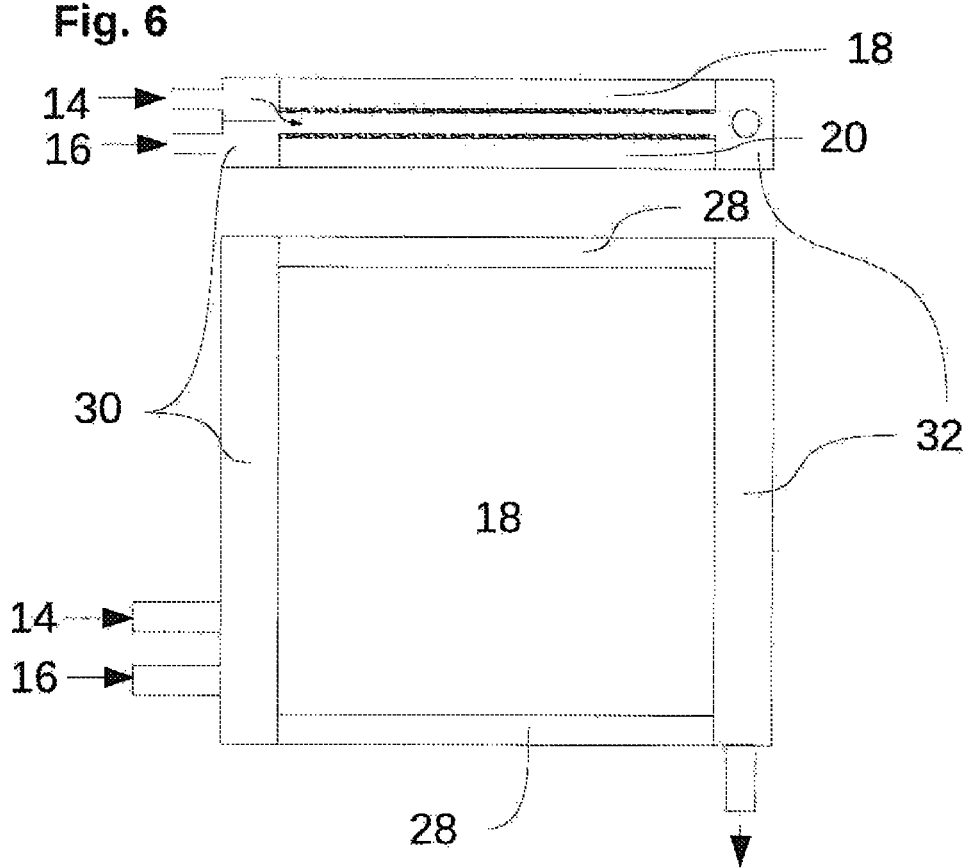

FIGS. 5 and 6 show the detailed scheme of a possible realization of the cell and of the arrangement of electrodes and, illustrative but not restraining, in exploded view, in axonometric and orthogonal projection; and FIG. 7 shows the general electric schematics concerning a possible implementation of the electric system, illustrative but not restraining, which is responsible of charging and discharging the electrodes.

Figure 1:
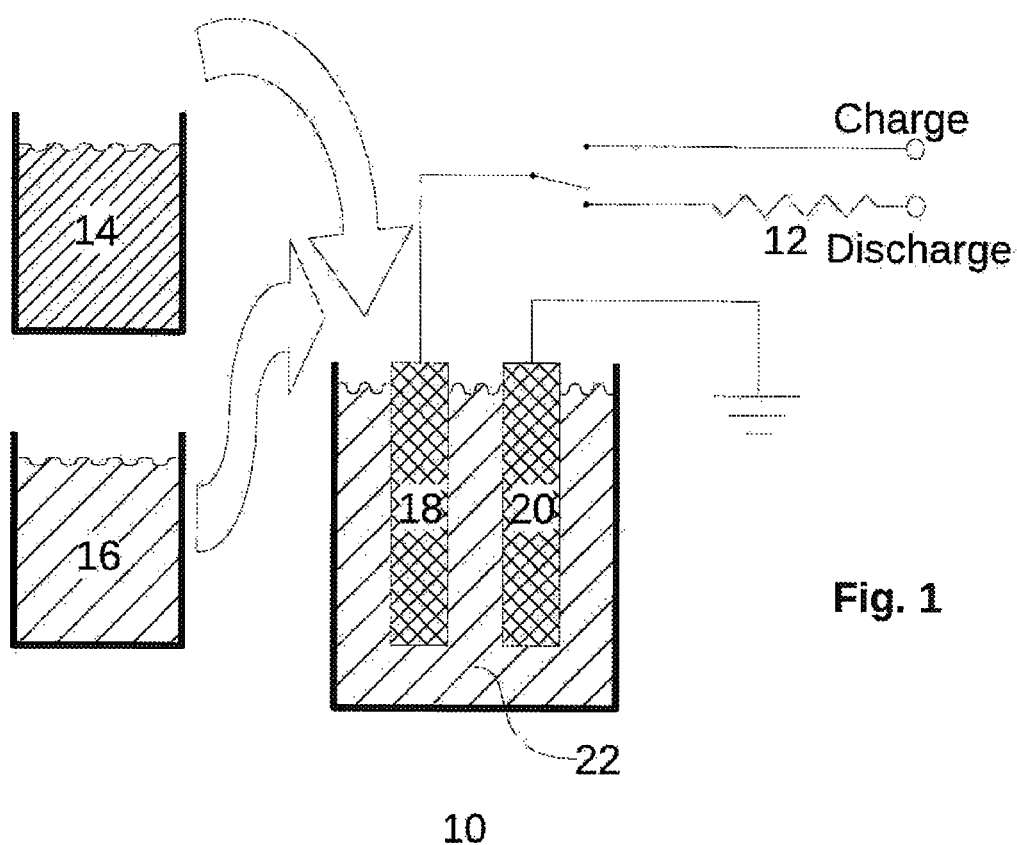
FIG. 1 is a general outline of an example of preferred implementation of a device for generating electricity by using solutions with different ionic concentrations according to the present invention.

With particular reference to FIG. 1, a preferred example is shown schematically, concerning a realization of a device for generating electricity using solutions with different ionic concentrations according the present invention, indicated overall with the reference number 10.

The source of energy used by the device is the difference of ionic concentration of the two solutions 14 and 16, so that the solution 14 has a higher ionic concentration of the solution 16. In a typical application, the two solutions are fresh water from a river and salt water from the sea, or sea water and water from an evaporation pond.

The cell 22 contains a liquid, obtained from one of these solutions 14 and 16, or a mixture of them. The method is characterized by the fact that the liquid contained in the cell 22 is modified in its composition, by injecting in the cell, at different times and in different proportions, the two solutions 14 and 16, in order to alter the ionic concentration of the solution in the cell 22, or in its parts. This operation aims to obtain at least two different phases: a "high concentration phase", in which the liquid in the cell 22 is mainly composed of the solution 14 and a "low concentration phase", in which the liquid in the cell 22 is mainly composed of the solution 16.

The device includes at least two electrodes 18 and 20, at least partially immersed in the liquid in the cell 22. In one part of the "high concentration phase" a current is made flow between the electrodes 18 and 20, so that they are electrically charged (charge phase): they behave like a capacitor. If the voltage does not exceed the value at which redox reactions can be activated, the capacitor retains its charge. In the case of aqueous solutions, the limit value of the potential difference is 1V. In this phase, energy is consumed. When later the "low concentration phase" starts, the equivalent capacitance of the capacitor formed by two electrodes 18 and 20 decreases. Since its accumulated charge is not reduced, its electrostatic energy increases, and is used, by allowing a current flow between the electrodes through the load 12 (discharge phase). The energy consumed during the charge phase is less than the energy extracted during the discharge phase, so effectively the system has extracted energy by using the free energy coming from the difference of ionic concentration of solutions.

From the point of view of energy conservation, this energy is extracted at the expense of thermal energy of the liquid: in order to maintain the temperature, the liquid absorbs heat. From the point of view of the second law of thermodynamics, the system uses the free energy of the difference of ionic concentration: actually, after the extraction of energy, part of the initial solutions becomes mixed, and increases its entropy.

The use of electrodes of porous material increases the capacitance of the system and allows to reduce the size of the electrodes. In particular, activated carbon, carbon aerogels and nanotubes, developed to build supercapacitors, can be usefully employed for this invention.

Figure 2:
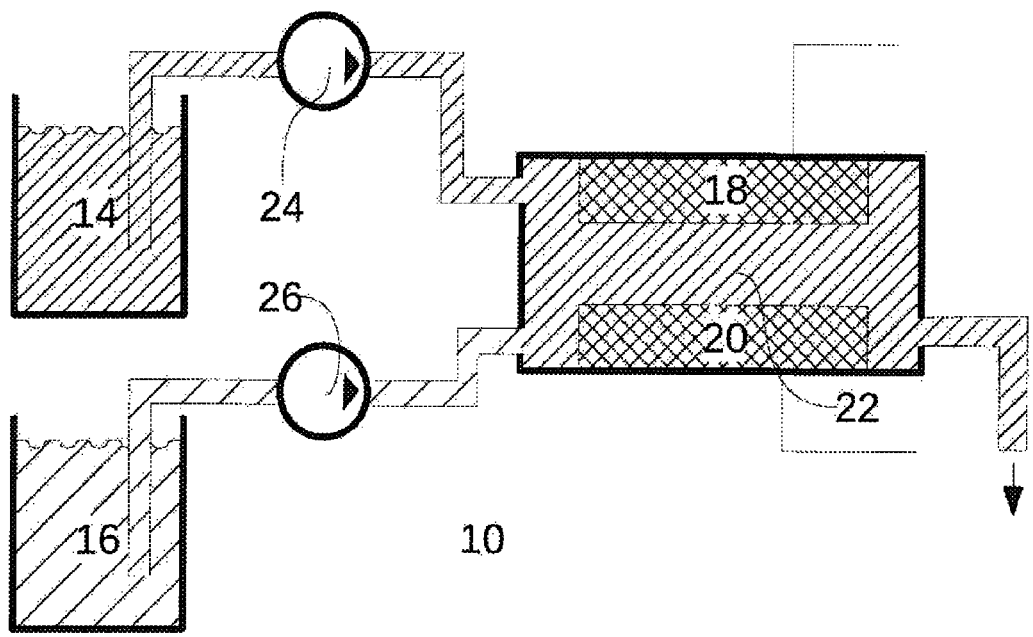
FIGS. 2, 3 and 4 show diagrams of the three examples, illustrative but not restraining, of implementation of the hydraulic system and of the cell, showing how the solutions can be used in order to change the ion concentration within the cell.
Figure 3:
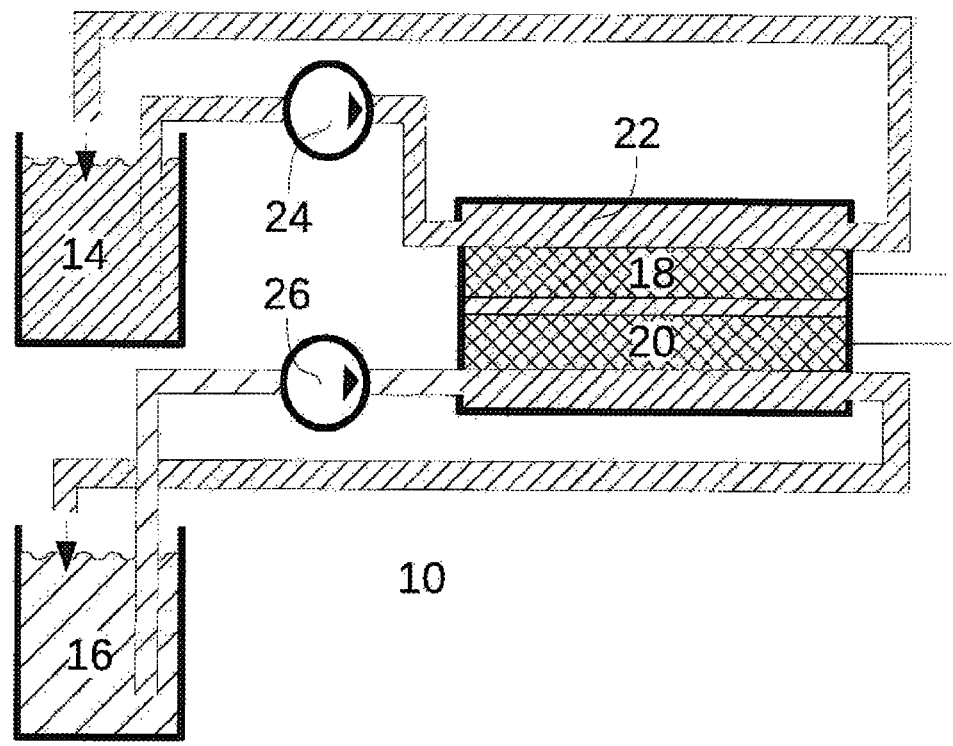
Figure 4:
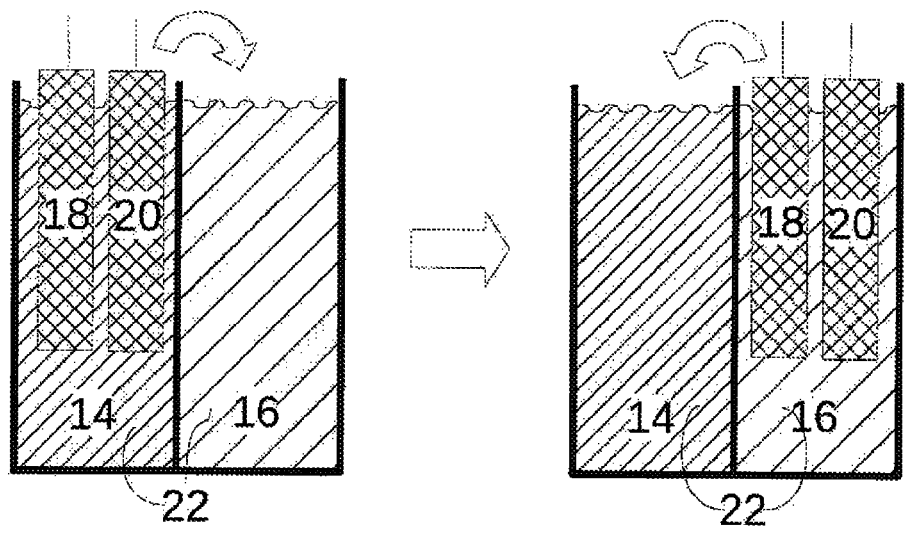

The system that is responsible for changing the composition of the liquid in the cell 22 and the cell itself can be implemented in any manner; three examples are shown in FIGS. 2, 3 and 4; these figures are illustrative but not restraining.

In FIG. 2, the two electrodes 18 and 20 are arranged on opposite walls of the cell 22. The gap between the electrodes 18 and 20 is filled alternately with the solution 14 or 16, by activating one of two pumps 24 or 26. This allows to switch between the "high concentration phase", after the pump 24 have been activated, to the "low concentration phase", after the pump 26 have been activated.

In the scheme proposed in FIG. 3, the electrodes 18 and 20 are placed parallel to each other, at a small distance, and are composed of porous material. The cell 22 is divided by the pair of electrodes 18 and 20, constituting a separation, into two portions. In this case, the pumps 24 and 26 make flow, at different stages, the solutions 14 and 16 in the two portions of the cell. When the pump 24 is activated and the pump 26 is deactivated, the solution 14 flows, and, through diffusion, the concentration across the whole cell increases, and the "high concentration phase" is obtained. Subsequently, the pump 24 is deactivated and the pump 26 is activated. Through diffusion the concentration of the liquid in the cell decreases.

In the scheme proposed in FIG. 4, the cell 22 is composed of two separate compartments, each of which contains one of the solutions 14 and 16. The electrodes 18 and 20 are moved from one compartment to another in subsequent phases. When the electrodes 18 and 20 are immersed in the solution 14 the "high concentration phase" takes place, whereas when they are immersed in the solution 16 the "low concentration phase" takes place.

According to a practical example for implementing the device to generate electricity according with the present invention, the electrodes are made of graphite square plates, with side 10 cm, 1 mm thick. On these plates a 0.1 mm thick layer, composed of activated carbon, is deposited. This deposition may be done by following the procedures adopted for manufacturing supercapacitors made of activated carbon. In an example of a procedure for obtaining this layer, the activated carbon is first ground up in grains smaller than a micron; it is mixed with a quantity of 5% compared to carbon of a polymer which acts as a binder (e.g. PVDF, polyvinylidene fluoride); it is mixed with a suitable solvent for the polymer (e.g. dimethylacetamide or N-methyl-2-pyrrolidone) in quantities suitable to obtain the complete dissolution of the polymer, and a consistency equal to that of a paint for brush; finally, the so-obtained suspension is spread on one side of the plates of graphite, with a thickness of 0.1 mm and allowed to dry.

A single cell (FIGS. 5 and 6) is obtained by assembling a couple of plates, parallel, at a distance of 1 mm, so that the layer of activated carbon is within the gap between the plates. They constitute the electrodes 18 and 20. Two opposite sides of the plates are then sealed with gaskets 28, and the remaining two sides are connected to ducts 30 and 32, which constitute a hydraulic system that allows filling the space between the plates in successive phases, with salt water coming from the sea and fresh water from a river, that may also contain a small amount of sea water, in order to increase the conductivity.

Two copper wires are placed outside, connected to each plate.

An electrical circuit that uses the device 10 is shown schematically in FIG. 7. The electrodes 18 and 20 are connected in series to the load 12 and the capacitor 36, with capacitance 300 F (a supercapacitor). The circuit in which the load 12 is inserted may be opened or closed by the switch 38. When the circuit is open, the power supply 34, supplying 400 mV, is connected to the capacitor 36 in order to recharge it.

The method consists of four phases:

1) The switch 38 opens the load 12 circuit. The cell 22 is filled with salt water. The capacitor 36 is recharged up to the voltage 400 mV by the power supply 34.

2) The switch 38 closes the load 12 circuit. A current flows through the electrodes 18 and 20, powering the load 12.

3) The switch 38 opens the load 12 circuit. The cell 22 is filled with fresh water. The capacitor 36 is recharged up to the voltage 400 mV by the power supply 34.

4) The switch 38 closes the load 12 circuit. A current flows through the electrodes 18 and 20, powering the load 12.

At each cycle, an energy of about 20 mJ is provided to the load. The water that circulates in the cell for each cycle is 10 cm$^3$. Some energy is consumed in phases 1 and 3 for charging the capacitor 36, in order to compensate the leakage current (about 1 mJ), and in phases 2 and 4 to move the fluid (about 1 mJ). This energy consumption must be subtracted from the energy supplied to the load. A system may include a large number of cells, in order to achieve the required power, or bigger cells.

Thus it has been shown that the device and method for generating electricity by using solutions with different ionic concentrations according to the present invention achieves the purposes outlined above. In particular, it has been shown that the device is able to generate electricity by using ionic solutions at different concentrations; compared to the known technique, it is possible to appreciate the opportunity to avoid the use of both dynamos and alternators, and both semipermeable membranes, selective or ion-exchange; this feature allows to reduce costs and maintenance. Moreover, it can be noted that the device does not alter significantly the qualitative composition of the incoming solutions, but simply changes the concentration, as if these were mixed, therefore ensuring the most complete absence of pollution.

The device that generates electricity using solutions with different ionic concentrations of the present invention thus conceived is susceptible in all cases of numerous modifications and variants, all falling within the same inventive concept; moreover, all the details are replaceable by technically equivalent elements. In practice, the shapes and sizes can be whatever, according to technical requirements.

The scope of protection of the invention is therefore defined by the appended claims.

The invention claimed is:

1. A method for generating electrical energy with a device comprising:
    a cell configured to contain a liquid comprising one or more of a solution having a higher ionic concentration and a solution having a lower ionic concentration, the cell comprising at least two electrodes made of a conductive material with a gap between the electrodes, wherein during use the electrodes are at least partially immersed in said liquid;

at least one pump configured to alternately fill the gap between the electrodes with the solution having a higher ionic concentration and the solution having a lower ionic concentration or vice versa, wherein the ionic concentration of said liquid in which said electrodes are immersed is modified in succeeding phases, by substituting or mixing said liquid with said solutions; and a switch configured to switch between at least a charge phase in which said electrodes are electrically charged, and at least a discharge phase in which said electrodes are electrically discharged completely or partially, wherein the device is configured to produce a net increase in electric energy, wherein the method comprises successively contacting said electrodes with the solution having a higher ionic concentration and the solution having a lower ionic concentration, and said contacting comprises:

opening the switch and filling the cell with the solution having a higher ionic concentration;

closing the switch such that current flows through the electrodes, powering a load;

opening the switch and filling the cell with the solution having a lower ionic concentration; and closing the switch such that current flows through the electrodes, powering the load.

2. The method according to claim 1, wherein the ionic concentration of said liquid in which the electrodes are immersed during at least part of the said charge phase is higher than the ionic concentration of said liquid in which the electrodes are immersed during at least part of the said discharge phase.

3. The method according to claim 1, wherein said electrodes are fixed, and at least two different among said solutions with different ionic concentration are let flow and taken into contact with said electrodes, in subsequent phases.

4. The method according to claim 1, wherein at least one of said electrodes is made of a porous conductive material.

5. The method according to claim 1, wherein one of said used solutions is constituted by fresh water, including that taken from rivers, lakes, low-salinity lagoons, water table, coming from rainfalls, both in liquid and solid form.

6. The method according to claim 1, wherein one of said solutions is constituted by salt water, including water taken from the sea, high-salinity lagoons, or wells close to the coastline.

7. The method according to claim 1, wherein one of the solutions is constituted by salt water, whose concentration has been increased by evaporation.

8. The method according to claim 1, wherein one of said solutions is constituted by fresh water, mixed in any proportion to salt water.

9. The method according to claim 1, wherein the method comprises:

opening the switch, filling the cell with the solution having a higher ionic concentration, and charging a capacitor by a power supply;

closing the switch such that current flows through the electrodes, and powering a load;

opening the switch, filling the cell with the solution having a lower ionic concentration, and recharging the capacitor by the power supply; and closing the switch such that current flows through the electrodes, powering the load.

10. The method according to claim 9, wherein the device has a voltage that does not exceed a value at which redox reactions can be activated such that the electrodes retain their charges.

11. The method according to claim 1, further comprising a capacitor electrically connected to the switch and the electrodes.

12. The method according to claim 11, further comprising a power supply electrically connected to the capacitor.

13. The method according to claim 1, further comprising a load electrically connected to the electrodes.

* * * * *